(12) United States Patent
Hauber

(10) Patent No.: US 6,893,604 B2
(45) Date of Patent: May 17, 2005

(54) REINFORCED THERMOPLASTIC STORAGE VESSEL MANUFACTURE

(75) Inventor: David E. Hauber, Troy, NY (US)

(73) Assignee: ADC Acquisition Company, Schenectady, NY (US)

(*) Notice: Subject to any disclaimer, the term of this patent is extended or adjusted under 35 U.S.C. 154(b) by 290 days.

(21) Appl. No.: 10/267,122

(22) Filed: Oct. 10, 2002

(65) Prior Publication Data
US 2003/0037860 A1 Feb. 27, 2003

Related U.S. Application Data

(62) Division of application No. 09/726,252, filed on Nov. 30, 2000, now Pat. No. 6,716,503.

(51) Int. Cl.$^7$ ............................................. B29C 70/44
(52) U.S. Cl. ..................... 264/516; 264/257; 264/258; 264/314; 264/324; 156/156; 156/172; 220/589; 220/590
(58) Field of Search ................................ 264/257–258, 264/516, 324, 314; 156/156, 172; 220/589, 590

(56) References Cited

U.S. PATENT DOCUMENTS

| | | | | |
|---|---|---|---|---|
| 3,282,757 A | * | 11/1966 | Brussee | 264/516 |
| 4,078,957 A | * | 3/1978 | Bradt | 156/173 |
| 4,123,307 A | * | 10/1978 | Lemelson | 156/172 |
| 5,499,739 A | | 3/1996 | Greist, III et al. | |
| 5,526,994 A | | 6/1996 | Murphy | |
| 6,171,423 B1 | | 1/2001 | Murphy et al. | |
| 6,565,793 B1 | * | 5/2003 | Goldsworthy et al. | 264/516 |

* cited by examiner

Primary Examiner—Stefan Staicovici

(57) ABSTRACT

A method is disclosed for reinforcement of thin wall hollow thermoplastic storage vessels with one or more wraps of continuous fibers. This method requires thermal bonding between the reinforcement fibers and the outer surface of the thermoplastic storage vessel while the interior cavity of the storage vessel is being pressurized. The fiber wraps can also be oriented in spatial directions further resisting internal stress on the storage vessel walls when put in service.

21 Claims, 2 Drawing Sheets

REINFORCED THERMOPLASTIC STORAGE VESSEL MANUFACTURE

This is a division of application Ser. No. 09/726,252 entitled Method to Reinforce Thin Wall Thermoplastic Storage Vessels filed Nov. 30, 2000, now U.S. Pat. No. 6,716,503.

BACKGROUND OF THE INVENTION

This invention relates generally to a method for reinforcement of hollow thermoplastic storage vessels with one or more wraps of continuous fibers and more particularly to a means for improved bonding between the applied fibers and the outer vessel surface for storage vessels having relatively thin walls.

In a co-pending application Ser. No. 09/327,003 entitled "Reinforced Thermoplastic Pipe Coupling" and filed Jun. 7, 1999, now U.S. Pat. No. 6,164,702 in the names of David E. Hauber, Robert J. Langone and James A. Mondo which is also assigned to the present assignee, there is disclosed a continuous fiber reinforced thermoplastic pipe coupling having improved resistance to applied stress when used with pipe lengths being joined together. The fiber reinforcement is aligned during placement in a particular manner and placed at predetermined fiber angles dictated by mechanical forces being applied such as by internal fluid pressure in the coupled pipe lengths. Said already known method for construction of said reinforced thermoplastic pipe coupling includes a controlled directional orientation of the fiber component to enable the fiber placement to be fixed for maximum effectiveness in withstanding the particular stress being generated when the joined together pipe lengths are customarily used for the transfer of pressurized fluids. Since the fiber materials currently used in this manner are generally stronger than the polymer matrix compositions also being employed, the overall strength produced in the composite member depends largely upon the fiber placement direction for the particular end product. The fiber reinforced coupler is thereby only as strong as the spatial direction of the included fibers with respect to the direction of the internal stress when applied to said member. Thus, when the fiber reinforced coupler is stressed by internal fluid pressures in the direction of the fiber placement, the applied load is withstood primarily by the included fibers and the coupler strength in resisting such stress is at a maximum value. Conversely, when the composite member is stressed in a perpendicular direction to the fiber direction, the applied force must necessarily be resisted primarily by the polymer matrix so that the coupler strength is at minimum. The relative amounts of the individual stresses being applied to the fiber reinforced coupler must also necessarily be considered for proper fiber placement direction. For an externally unconstrained installation of said previously disclosed pipe couplings, such as encountered with above ground pipe installations, the applied loads can be examined by treating the joined pipe lengths as a pressure vessel. From such analysis it was found that the stress applied to the pipe wall in the hoop direction is twice an amount as the applied stress in the pipe's axial direction. Employing well recognized shell theory calculation, it was further found that a fiber-angle of 55 degrees was needed to balance these applied loads assuming 90 degrees to be in the pipe hoop direction and 0 degrees to be aligned in the direction of the pipe longitudinal axis. For constrained pipe installations, however, such as in-ground or having the pipe ends being held there, there can only be need for resisting hoop stress. Accordingly, fiber placement at or near a 90 degree angle with respect to the longitudinal pipe axis was dictated while further recognizing that some angle less than 90 degrees may only be achievable with the fiber winding in the customary manner. The entire contents of said referenced co-pending application are hereby specifically incorporated into the present application.

It can readily be appreciated that thermoplastic storage vessels undergo similar internal stress when being utilized. Accordingly, the effectiveness of fiber reinforcement for thermoplastic storage vessels will also depend to a considerable degree upon the same factors previously considered with respect to said reinforced thermoplastic couplings. For example, a thermoplastic storage vessel having a cylindrical configuration can generally have the fiber wraps applied in a hoop direction for maximum reinforcement whereas a spherical storage vessel will understandably have the fiber placement angle varied in different spatial directions. It has now been found, however, that thermal bonding the reinforcement fibers to the outer surface of the thermoplastic storage vessel in the same manner previously employed for reinforcement of said thermoplastic pipe couplings produces inferior results. Specifically, the previously employed bonding method provided sufficient thermal expansion of the thermoplastic inner coupling member when being carried out that an effective thermal bonding with the applied fiber reinforcement took place. This does not reliably occur for various shaped thermoplastic storage vessels having a lesser wall thickness. It thereby becomes necessary for said relatively thin wall storage vessels to adopt an improved thermal bonding procedure for the fiber reinforcement to have the desired effectiveness.

It is an important object of the present invention, therefore, to provide a novel method to reinforce thin wall thermoplastic storage vessels with one or more wraps of applied continuous fiber.

It is still another object of the present invention to provide a novel method to secure the applied fibers to the outer surface of a thin wall thermoplastic storage vessel so as to better resist internal stress when the storage vessel is in use and prevent delamination when pressure is released.

Still another object of the present invention is to provide a novel method for reinforcement of a thin wall thermoplastic storage vessel which includes a plurality of continuous juxtapositioned fibers being reliably secured to the outer surface of said storage vessel so as to be aligned in a predetermined spatial direction resisting applied internal stress during vessel use.

These and still further objects of the present invention will become more apparent upon considering the following more detailed description of the present invention.

SUMMARY OF THE INVENTION

It has now been discovered by the present applicant that a contemporaneous pressurization of the internal cavity in a thin wall thermoplastic storage vessel while the applied reinforcement fibers on the outer surface of said storage vessel are being thermally bonded thereto overcomes the problem previously experienced with inadequate joinder of said reinforcement means. The internally applied pressure is seen to avert buckling or wrinkling of the thin storage vessel wall while being heated sufficiently for joinder between the reinforcement fibers and the outer vessel surface thereby enabling a sufficient bonding action therebetween. Internal pressurization of the storage vessel can thereafter be discontinued in the present reinforcement method allowing the fiber wrapped storage vessel to cool upon termination of said thermal bonding action. Accordingly, the present method to reinforce said type thin wall hollow storage vessel comprises wrapping a plurality of continuous juxtapositioned reinforcement fibers formed with a material composition selected from the group consisting of ceramics, metals, carbon and organic polymers while in an unbonded condition about the outer surface of said storage vessel, heating the outer vessel surface sufficiently to cause thermal bonding between the reinforcement fibers and said outer fiber wrapped vessel surface, contemporaneously pressurizing the interior cavity of said rotating fiber wrapped storage vessel with a coolant medium during said heating step, and allowing the fiber wrapped storage vessel to cool upon terminating said heating step before discontinuing pressurization of the vessel interior cavity. Various liquid or gaseous coolants can be employed in the present method to include water, air, nitrogen or the like, while removal of said coolant medium from the storage vessel after being heated during the present thermal bonding step can assist final cooling of said reinforcement fiber wrap vessel. Thermal bonding in the present method involves some melting of the thermoplastic materials being employed so that melting of the thermoplastic outer vessel surface occurs which can be accompanied by melting of a thermoplastic matrix included in the applied fiber reinforcement. Accordingly, a softening or melting action takes place during the present thermal bonding step between the outer surface of the thermoplastic storage vessel and any thermoplastic polymer materials serving as the matrix composition in selected preformed tape embodiments having the continuous reinforcement fibers thereafter becoming permanently bonded therein.

The herein defined fiber reinforcement method understandably enables a wide variety of fiber materials to be selected as previously pointed out. Thus, a reinforcement fiber material can be selected from the aforementioned class of suitable materials so long as it is mechanically stiffer than the selected thermoplastic vessel polymer and has a glass transition or melting temperature higher than the surface temperature of the thermoplastic vessel during use. Selected polymer fibers can understandably include continuous bare filaments and commingled continuous fibers which can be wetted by polymer melt flow in the above described heat bonding procedure. For selection of a suitable preformed continuous fiber material or prepreg tape having a matrix formed with a thermoplastic polymer, said matrix polymer is desirably chosen to have a softening or melt temperature equal to or lower than the softening temperature of the selected vessel polymer. Any suitable heating source can be used in the present method to reliably bond the applied fiber reinforcement to the outer thermoplastic vessel surface. Contemplated heat sources include but are not limited to inert gases, oxidizing gases and reducing gases, including mixtures thereof, infrared heating sources, such as infrared panels and focused infrared means, conduction heating sources such as heated rollers, belts and shoe devices, electrical resistance heating sources, laser heating sources, microwave heating sources, RF heating sources, plasma heating sources and ultrasonic heating sources. An external flame heating source provides economical heating with high-energy densities and with the gas burner or burners being suitably designed so as to heat the outer circumference of the fiber wrapped thermoplastic vessel. In a preferred embodiment, the wrapped storage vessel is rotated about the selected heat source while having the interior cavity of said storage vessel being subjected to a pressurized condition. The applied pressure can desirably produce some radial expansion of the storage vessel wall thereby further enhancing the thermal bonding action taking place. The applied pressurization can also be initiated prior to said heating step in the present method with applied pressures of ten pounds per square inch or more having been found effective.

The fiber alignment selected in the present method can also vary with the particular shape of the thermoplastic storage vessel being reinforced in said manner. Thus, a cylindrically shaped thermoplastic water heater can have one or more wraps of the reinforcement fibers aligned in a hoop or helical direction whereas a spherical thermoplastic storage vessel for the same use can understandably be wrapped in different spatial directions. A means of preserving the fiber alignment in the present method until the melted polymer in physical contact therewith again becomes solid can require that said fibers be subjected to appropriate applied mechanical force during the thermal bonding action. Such manner of fiber placement can be carried out by employing external tension winding means to guide the fiber reinforcement while being wound around the outer vessel surface. An alternate means for retaining the fiber alignment is a compaction roller to apply mechanical pressure to the heated fiber and polymer materials while being bonded together. Use of a compaction roller in such fiber placement can apply an external compaction force with zero tension force being applied if desired although it is within contemplation of the present invention for both forms of external mechanical energy to be employed together when found beneficial. Another advantage of compaction roller use is the ability to orient such means in any spatial direction enabling fiber placement at a predetermined fiber angle dictated by the contour of the particular storage vessel being reinforced in said manner. Thus, a cylindrical shaped thermoplastic pressure vessel can have one or more wraps of the reinforcement fibers aligned in a hoop or helical direction whereas a spherical thermoplastic storage vessel for such use can be wrapped in different spatial directions.

Following termination of said thermal bonding step in the present method, the fiber wrapped storage vessel can be allowed to cool in the ambient atmosphere. Such cooling can be carried out in various ways to include removal of any pressurizing liquid or gas coolant heated during the thermal bonding procedure as well as actively cooling with an applied coolant medium. The completed fiber reinforcement can now serve to enable sufficiently higher operating pressures in said storage vessels than otherwise permissible. Employment of the present method upon an otherwise conventional thermoplastic pressure vessel having a closed end cylindrical configuration has produced this result. Additionally, an outer protective or decorative coating to include heat shrinkable tubing, wrap or extruded coatings and the like can be applied to said fiber reinforced thermoplastic storage vessel in a conventional manner for protection of the fiber reinforcement from environmental or mechanical damage and/or corrosion.

DETAILED DESCRIPTION OF THE PREFERRED EMBODIMENTS

Figure 1:
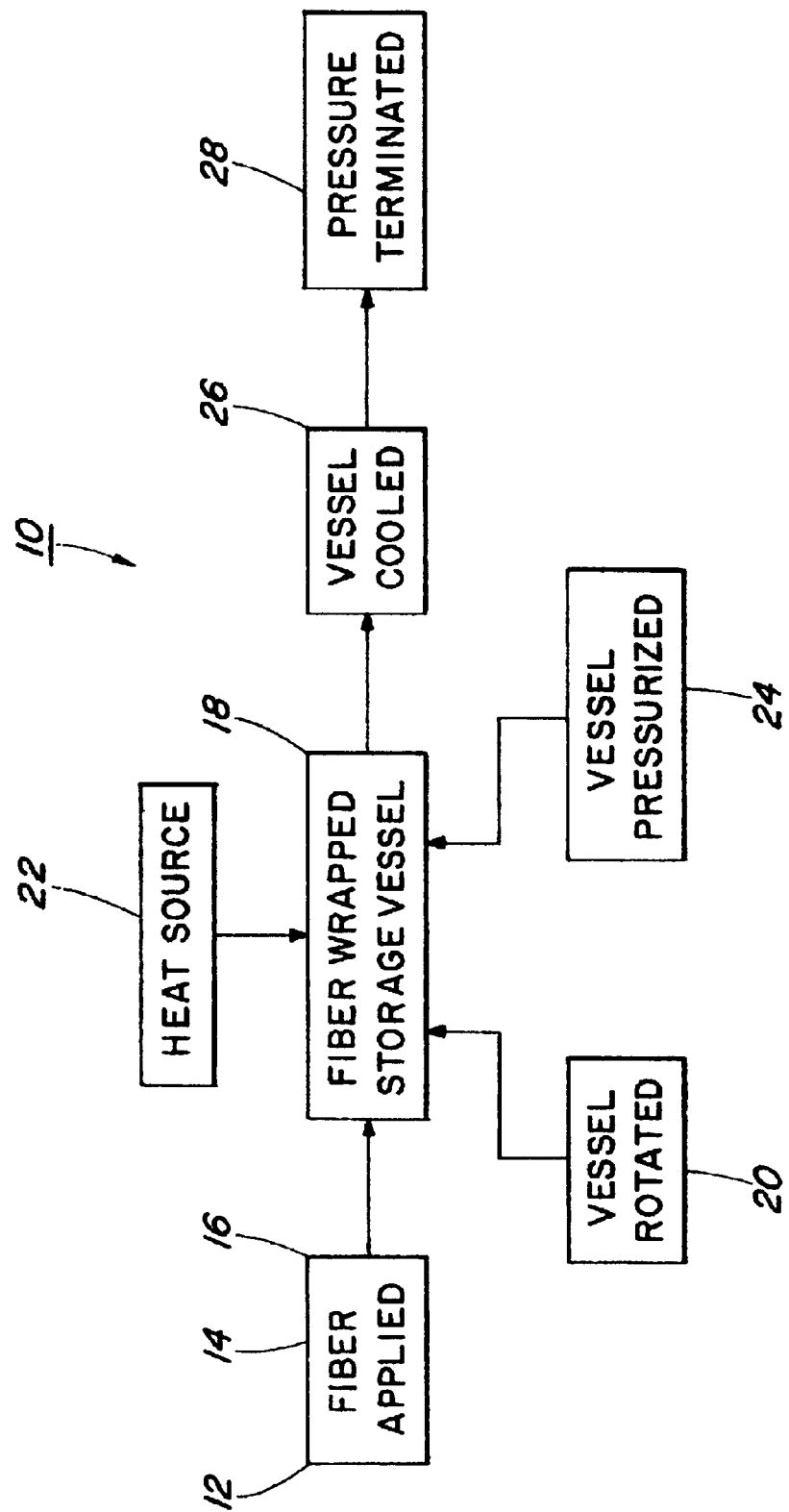
FIG. 1 is a block diagram illustrating successive processing steps which can be employed in carrying out the method of the present invention.

Referring to the drawings, FIG. 1 is a block diagram representation illustrating the sequence of processing steps employed according to the present invention for fiber reinforcement of a representative thermoplastic storage vessel having a closed end cylindrical configuration. The depicted fiber reinforcement process 10 employs a typical six inch diameter, thirty-two inch long thermoplastic liquid container 12 having a 0.14 inch wall thickness which has one or more wraps of the thermoplastic reinforcement fibers 14 helically wound about the outer cylindrical surface of said storage vessel. One or more tie wraps 16 of said thermoplastic reinforcement fibers can also be subsequently applied in the hoop direction for the purpose of carrying the radial stress in the cylindrical pressure vessel. Said fiber wrapped vessel 18 next undergoes thermal bonding of the applied fiber reinforcement to the outer vessel surface. In a preferred embodiment, the fiber wrapped vessel is rotated about its central axis 20 while heating the outer vessel surface with a conventional heat source 22. Heating of the fiber wrapped vessel in said manner produces some melting of the outer vessel surface which upon vessel cooling retains the originally applied spatial orientation of said fibers. During said heating step the hollow interior cavity of said fiber wrapped storage vessel 18 is pressurized 24 by various means to avoid any significant wrinkling or collapse of the vessel wall that could understandably deter a fully bonded condition for the applied fiber reinforcement. Internal pressurization of the storage vessel can be initiated before thermal bonding of the fiber reinforcement while thereafter being discontinued when the thermal bonding step has been completed and the reinforced storage vessel then being allowed to cool 26. Terminating pressurization of the storage vessel 28 can also be carried out in various ways. To further illustrate a suitable vessel pressurization in the present method, the interior cavity of the fiber wrapped storage vessel 18 can be filled with a liquid coolant, such as water, glycol, alcohol and the like before the above described heating step is begun as well as thereafter being removed from the storage vessel after becoming heated during said processing step. Alternately, the interior cavity of said storage vessel 28 can be actively cooled with a suitable gaseous coolant to include air, nitrogen or other inert gas while the thermal bonding step is being carried out and with said cooling action being discontinued when the reinforced storage vessel is thereafter allowed to cool. Active cooling of the fiber wrapped storage vessel in said manner at a pressure of 10 PSI or more has been proven satisfactory in the present method.

As herein pointed out, the fiber direction of the underlying fiber layers for the illustrated cylindrical storage vessel is dictated primarily by the ability of said reinforced storage vessel to withstand internal fluid pressures when such vessel is-put into service. It can readily be appreciated, however, that other storage vessels having a different shape, such as a sphere, can have the fiber alignment in an overall hoop direction for better resistance to internal fluid pressures during use. Additionally, the continuous fiber reinforcement can be applied in the present method by various means. A selected amount of tension can be exerted upon the continuous fibers when being applied to assist with retention of the predetermined or juxtapositioned fiber angle with respect to the vessel longitudinal axis in the herein illustrated embodiment. Similarly, a mechanical compaction force exerted upon said fibers during initial placement or subsequent thermal bonding can be employed for this purpose. A wide variety of thermoplastic polymers can also be selected as the material of construction for storage vessels being reinforced according to the present method. Suitable organic polymers include but are not limited to polyethylene such as high density polyethylene and medium density polyethylene, polypropylene, polyphenylene sulfide, polyetherketoneketone, polyamide, polyamideimide and polyvinylidene difluoride. A similar wide variety of materials are found suitable as the fiber reinforcement in the present method to again include but not be limited to ceramics, metals, carbon aramid and other organic polymer fibers having softening temperatures above that of the storage vessel in use and glass compositions such as E type and S type glasses. Moreover, said fiber materials can also be applied in various structural forms to include a parallel alignment of the bare fibers and conventional fiber tapes having the continuous parallel oriented fibers bonded together in a thermoplastic polymer matrix. The optional use being made of tie layers 16 in the presently illustrated embodiment can also serve to help retain the juxtapositioned spatial orientation of the applied fiber reinforcement when selected thermoplastic polymer materials being employed are not miscible during the heating step.

Figure 2:
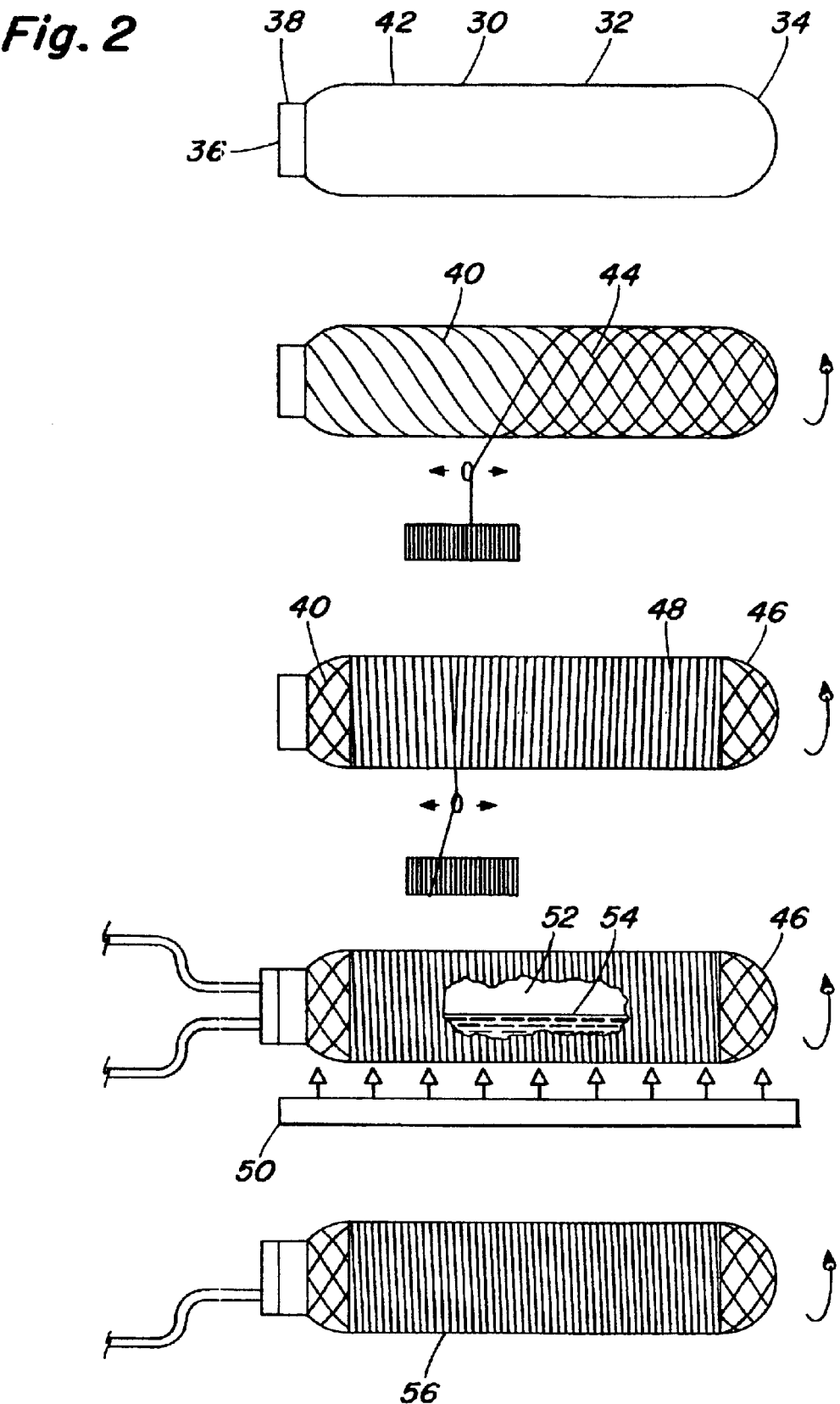
FIG. 2 is a side view for a representative thermoplastic storage vessel being reinforced according to the present invention.

FIG. 2 is a side view for a representative thermoplastic storage vessel being reinforced according to the present invention. More particularly, the depicted cylindrical thermoplastic storage vessel 30 is repeatedly illustrated during each processing step described in the preceding preferred embodiment. As shown, said storage vessel 30 comprises an elongated thermoplastic cylinder 32 having a closed end 34 and an open end 36 fitted with a conventional inlet coupling 38. There is next depicted the manner whereby the continuous reinforcement fiber 40 is deposited on the outer surface 42 of the rotating thermoplastic storage vessel in a helical pattern 44 while also being subjected to a tensile force being applied in the customary manner. The next processing step being illustrated depicts further rotation of the fiber wrapped storage vessel 46 while additional fiber wraps 48 are applied in a hoop direction enabling better retention of the underlying reinforcement fiber 40. The still further depicted processing step in the herein illustrated method of fiber reinforcement demonstrates the heating step being employed to cause thermal bonding between the applied unbonded reinforcement fibers and the outer surfaces of said storage vessel. In doing so, a conventional heat source 50 positioned in relatively close proximity to said fiber wrapped storage vessel 46 supplies the needed thermal energy during said bonding procedure and which is further accompanied by having the interior cavity 52 of said fiber wrapped storage vessel pressurized with a selected liquid cooling medium 54 while said thermal bonding step is being carried out. Following said latter procedure, the reinforced storage vessel 56 is allowed to cool in the ambient atmosphere which further include removal of the pressurizing fluid after sufficient time has elapsed for solidification of the polymers thermally bonded together.

It will be apparent from the foregoing description that a broadly useful and novel method has been provided to reinforce thin wall thermoplastic storage vessels with one or more wraps of applied continuous fiber. It will be apparent, however, that various modifications can be made in the disclosed process without departing from the spirit and scope of the present invention. For example, it is contemplated that some heating of the unbonded reinforcement when being initially applied to the outer surface of the storage vessel can assist in having the fiber conform more closely to the particular contours of the vessel surface. Likewise, it is contemplated that other organic polymers, other vessel shapes and other processing equipment than herein specifically disclosed can be substituted in carrying out the present method. Consequently, it is intended to cover all variations in the disclosed reinforcement method which may be devised by persons skilled in the art as falling within the scope of the appended claims.

What I claim as new and desire to secure by Letters Patent of the United States is:

1. A method to reinforce a thin all hollow storage vessel formed with a solid thermoplastic organic polymer while being physically suspended in a hollow condition which comprises:
   (a) wrapping a plurality of continuous juxtapositioned reinforcement fibers formed with a material composition selected from the group consisting of ceramics, metals, carbon and organic poloymers while in an unbonded condition about the outer surface of said suspended storage vessel, said reinforcement fibers being applied at a predetermined spatial angle for maximum effectiveness in withstanding the applied internal stress when the reinforced storage vessel is subseguently put into service,
   (b) externally heating the outer fiber wrapped vessel surface sufficiently to cause thermal bonding between the reinforcement fibers and said outer vessel surface while not further melting said underlying suspended storage vessel,
   (c) contemporaneously pressurizing the interior cavity of said suspended fiber wrapped storage vessel with a coolant medium during said heating steps, and
   (d) allowing the suspended fiber wrapped storage vessel to cool upon terminating said heating step before discontinuing pressurization of the vessel interior cavity.

2. The method of claim 1 which includes rotation of the suspended fiber wrapped storage vessel during said heating step.

3. The method of claim 1 wherein the reinforcement fibers are provided in a matrix formed with a solid thermoplastic polymer.

4. The method of claim 1 wherein the thermal bonding includes melting of the fiber matrix.

5. The method of claim 1 wherein the thermal bonding includes radial expansion of the suspended fiber wrapped storage vessel.

6. The method of claim 1 wherein the thermal bonding includes melting of the outer vessel surface as well as melting of the reinforcement fiber matrix while still averting further melting of the underlying suspended vessel.

7. The method of claim 1 wherein the reinforcement fibers are preheated when wrapped about the outer surface of the suspended storage vessel.

8. The method of claim 1 wherein pressurization of the vessel interior cavity of the suspended storage vessel is instituted prior to said heating step while being further retained during said heating step.

9. The method of claim 1 wherein the suspended storage vessel is allowed to cool below the melting temperature of the outer vessel surface upon terminating said heating step.

10. The method of claim 4 wherein the suspended storage vessel is allowed to cool below the melting temperature of the fiber matrix upon terminating said heating step.

11. The method of claim 1 wherein the reinforcement fibers are wrapped about the outer surface of said suspended storage vessel while being subjected to a selected amount of externally applied mechanical force.

12. The method of claim 11 wherein the reinforcement fibers are subjected to an external applied tensile force.

13. The method of claim 11 wherein the reinforcement fibers are subjected to an externally applied compression force.

14. The method of claim 1 wherein the coolant medium is a gas.

15. The method of claim 1 wherein the coolant medium is a liquid.

16. The method of claim 15 wherein said coolant medium is removed from the interior vessel cavity upon terminating said heating step.

17. The method of claim 1 wherein the suspended storage vessel has a cylindrical configuration.

18. The method of claim 1 wherein the suspended storage vessel has a spherical configuration.

19. The method of claim 17 wherein the reinforcement fibers include fibers wrapped in the hoop direction.

20. The method of claim 18 wherein the reinforcement fibers are wrapped in a different spatial direction.

21. The method of claim 1 wherein multiple wraps of the reinforcement fibers are employed.

* * * * *